United States Patent
Shin et al.

(10) Patent No.: US 10,151,389 B2
(45) Date of Patent: Dec. 11, 2018

(54) METHOD FOR CONTROLLING SHIFT SPEED OF CONTINUOUS VARIABLE TRANSMISSION

(71) Applicants: HYUNDAI MOTOR COMPANY, Seoul (KR); KIA MOTORS CORPORATION, Seoul (KR)

(72) Inventors: Sang Hee Shin, Goyang-si (KR); Se Jin Kim, Suwon-si (KR); Young Joon Kim, Seoul (KR); Kyung Moo Lee, Yongin-si (KR); Hyun Suk Kim, Seoul (KR); Chan Hyuk Song, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 10 days.

(21) Appl. No.: 15/645,476

(22) Filed: Jul. 10, 2017

(65) Prior Publication Data
US 2018/0172151 A1    Jun. 21, 2018

(30) Foreign Application Priority Data
Dec. 19, 2016  (KR) .................. 10-2016-0173580

(51) Int. Cl.
F16H 61/662    (2006.01)
(52) U.S. Cl.
CPC ............... *F16H 61/66259* (2013.01)
(58) Field of Classification Search
CPC ............................... F16H 61/66259
See application file for complete search history.

(56) References Cited

U.S. PATENT DOCUMENTS

| | | | |
|---|---|---|---|
| 9,441,733 B2* | 9/2016 | Takahashi | F16H 59/20 |
| 9,851,004 B2* | 12/2017 | Zhang | F16H 61/66272 |
| 9,863,531 B2* | 1/2018 | Kutsubo | F16H 61/12 |
| 2010/0241322 A1* | 9/2010 | Miyanoo | F16H 61/66272 701/54 |
| 2017/0009880 A1* | 1/2017 | Sata | F16H 61/662 |
| 2017/0037965 A1* | 2/2017 | Inoue | F16H 37/022 |

FOREIGN PATENT DOCUMENTS

| | | |
|---|---|---|
| JP | 5762261 B2 | 8/2015 |
| KR | 10-0534738 | 12/2005 |
| KR | 10-2009-0020062 A | 2/2009 |
| WO | 2013-132534 | 9/2013 |

\* cited by examiner

*Primary Examiner* — David J Hlavka
(74) *Attorney, Agent, or Firm* — Brinks Gilson & Lione

(57) ABSTRACT

A method for controlling a shift speed of a continuous variable transmission includes: a first calculating step for calculating a surplus oil pump RPM based on a transmission oil temperature, an engine RPM, and a turbine torque; a second calculating step to calculate a surplus oil amount based on the surplus oil pump RPM, the transmission oil temperature, the engine RPM, and a line pressure; a third calculating step to calculate an allowable shift speed based on the surplus oil amount and a current gear ratio; a shift speed comparing step to compare the shift speed of a vehicle with the allowable shift speed; and a shift speed controlling step in which the controller varies the shift speed or the allowable shift speed to control the shift speed to be equal to or less than the allowable shift speed when the shift speed exceeds the allowable shift speed.

6 Claims, 2 Drawing Sheets

METHOD FOR CONTROLLING SHIFT SPEED OF CONTINUOUS VARIABLE TRANSMISSION

CROSS REFERENCE TO RELATED APPLICATION

Figure 1:
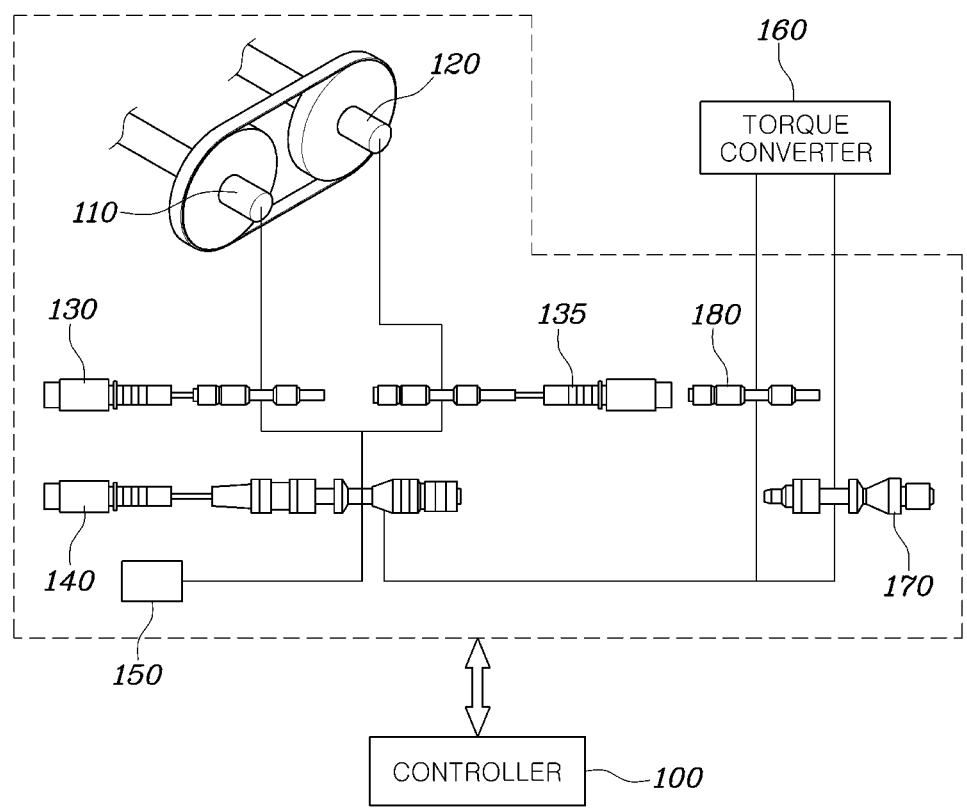

The present application claims priority to and the benefit of Korean Patent Application No. 10-2016-0173580, filed Dec. 19, 2016, the entire contents of which is incorporated herein by reference.

FIELD

The present disclosure relates to a method for controlling a shift speed of a continuous variable transmission.

BACKGROUND

The statements in this section merely provide background information related to the present disclosure and may not constitute prior art.

A continuous variable transmission (CVT) using a belt as a variator, which is a shift mechanism, is configured to receive power transferred from an engine by a primary pulley, transfer the power to a secondary pulley through the belt, and output power shifted through the secondary pulley to driving wheels.

In the continuous variable transmission as described above, a gear ratio is continuously changed by a difference in a dynamic radius formed between the belt and the pulleys. Therefore, an oil pressure applied to a pulley piston of a driving pulley of each pulley is controlled to change a dynamic radius formed between the belt and the pulleys, thereby obtaining a desired gear ratio.

In order to smoothly transfer the power between the pulleys and the belt without being slid, pulley clamping force corresponding to force of the pulleys pushing the belt should be appropriately formed. The pulley clamping force is determined depending on an input torque input from the engine to the pulleys, and in order to form the pulley clamping force determined as described above, a target oil pressure should be determined based on the pulley clamping force to control an oil pressure applied to the pulleys by the target oil pressure.

When the continuous variable transmission is in a tip-in situation, a down shift is performed by supplying oil to a driven pulley. We have discovered that when a speed of the down shift exceeds an allowable limit value, a surplus amount of oil in channels is decreased. As a result, a phenomenon that it is impossible to follow a target line pressure occurs. In addition, when the surplus amount of oil is decreased, a damper pressure is decreased, and a damper that is held is released.

The contents described above have been provided only for assisting in the understanding for the background of the present disclosure and should not be considered as corresponding to the related art known to those skilled in the art.

SUMMARY

The present disclosure provides a method for controlling a shift speed of a continuous variable transmission for reducing or preventing a situation in which an amount of oil becomes insufficient by calculating an allowable shift speed of a vehicle in which the continuous variable transmission is used and varying the shift speed or the allowable shift speed to limit the shift speed to the allowable shift speed or less in the case in which a shift is generated due to a tip-in situation in the vehicle.

According to an exemplary form of the present disclosure, there is provided a method for controlling a shift speed of a continuous variable transmission, including: a first calculating step in which a controller calculates a surplus oil pump revolution per minute (RPM) on the basis of a transmission oil temperature, an engine RPM, and a turbine torque; a second calculating step in which the controller calculates a surplus oil amount on the basis of the surplus oil pump RPM, the transmission oil temperature, the engine RPM, and a line pressure after the first calculating step; a third calculating step in which the controller calculates an allowable shift speed on the basis of the surplus oil amount and a current gear ratio after the second calculating step; a shift speed comparing step in which the controller compares a shift speed of a vehicle with the allowable shift speed after the third calculating step; and a shift speed controlling step in which the controller varies the shift speed or the allowable shift speed to control the shift speed to be maintained to be equal to or less than the allowable shift speed or less when the shift speed exceeds the allowable shift speed at the shift speed comparing step.

The shift speed controlling step may further include a step in which the controller confirms a driving mode of the vehicle, and when the driving mode is a normal mode or an eco mode as a result of performing the step in which the controller confirms the driving mode, the controller may limit the shift speed to the allowable shift speed.

In the case in which the driving mode is a sport mode as a result of performing the step in which the controller confirms the driving mode, the controller may control an engine to be driven at a target RPM so that the allowable shift speed is increased to arrive at the shift speed.

In the first calculating step, the controller may calculate a minimum oil pump RPM desired for a shift on the basis of the turbine torque, the engine RPM, and the transmission oil temperature, and compare the calculated minimum oil pump RPM and the engine RPM with each other to calculate the surplus oil pump RPM.

In the second calculating step, the controller may calculate a minimum oil amount desired for a shift on the basis of the surplus oil pump RPM, the transmission oil temperature, the engine RPM, and the line pressure, and compare the calculated minimum oil amount and a current oil amount with each other to calculate the surplus oil amount.

In the third calculating step, the allowable shift speed may be a value pre-mapped to be in proportion to the surplus oil amount and in reverse proportion to the current gear ratio.

Further areas of applicability will become apparent from the description provided herein. It should be understood that the description and specific examples are intended for purposes of illustration only and are not intended to limit the scope of the present disclosure.

DRAWINGS

Figure 2:
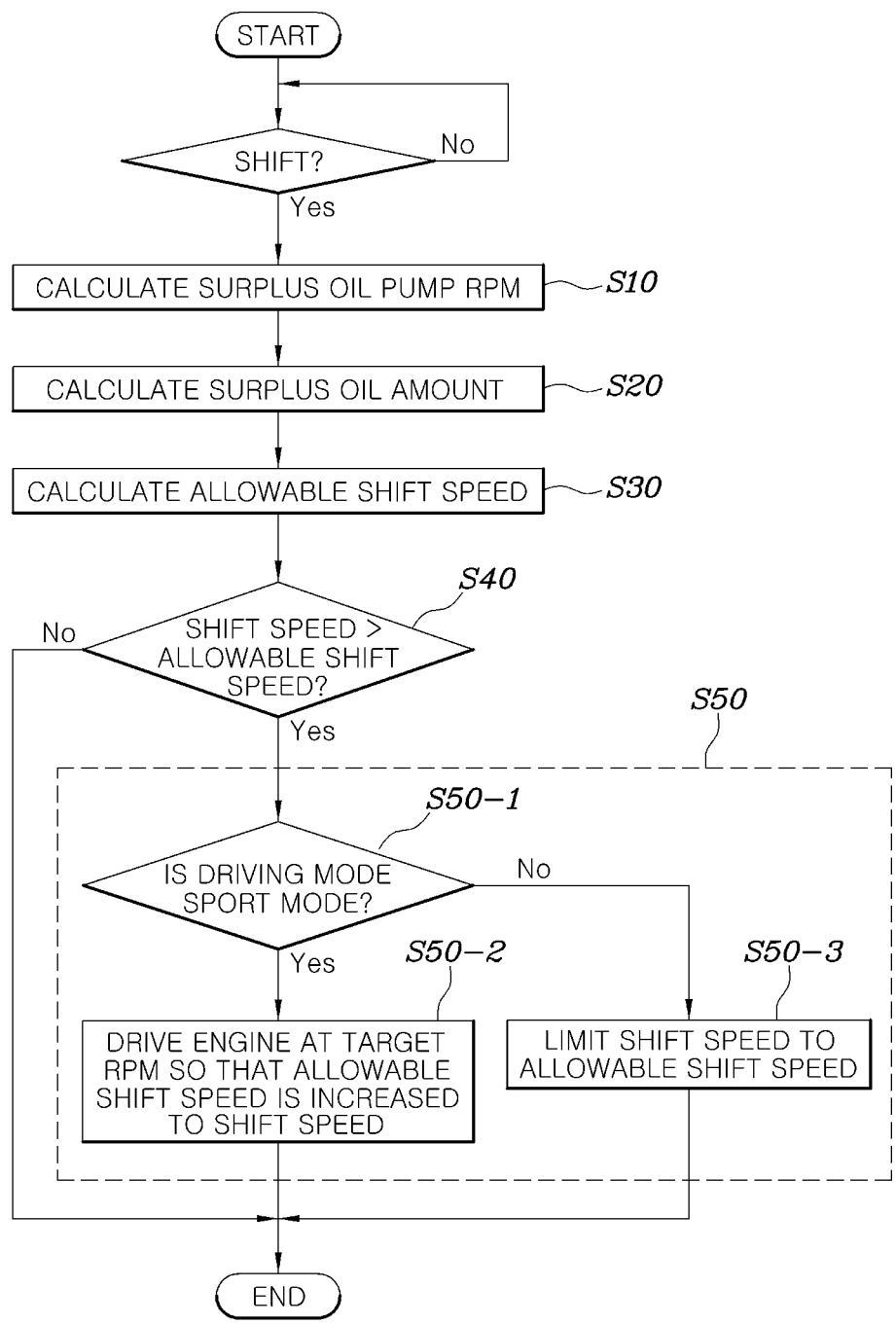

In order that the disclosure may be well understood, there will now be described various forms thereof, given by way of example, reference being made to the accompanying drawings, in which:

FIG. 1 is a view illustrating an oil pressure control apparatus of a continuous variable transmission; and FIG. 2 is a flow chart illustrating a method for controlling a shift speed of a continuous variable transmission.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a view illustrating an oil pressure control apparatus of a continuous variable transmission in one exemplary form of the present disclosure. Referring to FIG. 1, an oil pressure control apparatus of a continuous variable transmission includes a regulating valve 140 to control oil supplied from an oil pump 150 by a predetermined line pressure. A controller 100 controls solenoid valves 130 and 135 connected to the regulating valve 140 to determine amounts and pressures of oil supplied to a driving pulley 110 and a driven pulley 120 each connected to the solenoid valves 130 and 135. In addition, the controller 100 may control a pressure of oil introduced into a torque converter 160 through the regulating valve 140, and includes a torque converter control valve (TCCV) 170 controlling an amount of oil desired for operating the torque converter and a lock-up switch 180 capable of controlling whether or not a damper clutch of the torque converter 160 is operated. A method for controlling a shift speed of a continuous variable transmission using the oil pressure control apparatus of a continuous variable transmission described above will be described in detail below.

FIG. 2 is a flow chart illustrating a method for controlling a shift speed of a continuous variable transmission in one exemplary form of the present disclosure. Referring to FIG. 2, the method for controlling a shift speed of a continuous variable transmission may include: a first calculating step (S10) in which the controller calculates a surplus oil pump revolution per minute (RPM) on the basis of a transmission oil temperature, an engine RPM, and a turbine torque; a second calculating step (S20) in which the controller calculates a surplus oil amount on the basis of the surplus oil pump RPM, the transmission oil temperature, the engine RPM, and a line pressure after the first calculating step (S10); a third calculating step (S30) in which the controller calculates an allowable shift speed on the basis of the surplus oil amount and a current gear ratio after the second calculating step (S20); a shift speed comparing step (S40) in which the controller compares the shift speed of a vehicle with the allowable shift speed after the third calculating step (S30); and a shift speed controlling step (S50) in which the controller varies the shift speed or the allowable shift speed to control the shift speed to be maintained to be the allowable shift speed or less in the case in which the shift speed exceeds the allowable shift speed as a result of performing the shift speed comparing step (S40). The controller may be a transmission control unit (TCU).

In the first calculating step (S10), the controller may calculate a minimum oil pump RPM desired for a shift on the basis of the turbine torque, the engine RPM, and the transmission oil temperature, and compare the calculated minimum oil pump RPM and the engine RPM with each other to calculate the surplus oil pump RPM.

In detail, the controller calculates a TCCV pressure desired for operating the damper clutch of the torque converter and performing a shift on the basis of a difference between a current turbine torque and the engine RPM. Then, the controller calculates a minimum line pressure on the basis of the calculated TCCV pressure and the transmission oil temperature. Here, as the transmission oil temperature becomes low, viscosity of the oil becomes strong. Therefore, the minimum line pressure will be calculated to be large. In addition, the controller may calculate the minimum oil pump RPM desired for the shift on the basis of the calculated minimum line pressure and the transmission oil temperature. The surplus oil pump RPM may be calculated by a difference between the minimum oil pump RPM calculated as described above and the engine RPM corresponding to a current driving condition to secure data desired for calculating the allowable shift speed.

Then, in the second calculating step (S20), the controller may calculate a minimum oil amount desired for the shift on the basis of the surplus oil pump RPM, the transmission oil temperature, the engine RPM, and the line pressure, and compare the calculated minimum oil amount and a current oil amount with each other to calculate the surplus oil amount.

That is, the controller calculates the minimum oil amount desired for the shift on the basis of the minimum oil pump RPM calculated through the first calculating step (S10), the line pressure, and the transmission oil temperature. Here, the desired minimum oil amount is calculated in proportion to the line pressure and the transmission oil temperature.

In addition, the controller may calculate a current oil amount currently discharged from the oil pump on the basis of the transmission oil temperature, the line pressure, and the engine RPM, which are data corresponding to the current driving condition, and calculate the surplus oil amount, which is a value obtained by subtracting the minimum oil amount from the current oil amount, thereby securing data for calculating the allowable shift speed.

Then, in the third calculating step (S30), the controller may calculate the allowable shift speed corresponding to the surplus oil amount calculated from the second calculating step (S20) and the current gear ratio. Here, the allowable shift speed is a value pre-mapped to be in proportion to the surplus oil amount and in reverse proportion to the current gear ratio.

Therefore, in the case in which the vehicle performs the shift, when the shift speed exceeds the calculated allowable shift speed, the surplus oil amount in a transmission channel is decreased, such that it is impossible to follow a target line pressure, and a damper pressure is decreased, such that a damper is released. Therefore, it is desired to control the shift speed of the vehicle not to exceed the allowable shift speed in order to follow an accurate line pressure and inhibit or prevent a phenomenon that the damper is released.

To this end, in the present disclosure, after the third calculating step (S30), the controller performs the shift speed comparing step (S40) in which the controller compares the shift speed of the vehicle with the allowable shift speed. In addition, at the shift speed controlling step (S50), the controller decreases the shift speed or increases the allowable shift speed so as to control the shift speed to be maintained to be equal to or less than the allowable shift speed when the shift speed exceeds the allowable shift speed.

In detail, the shift speed controlling step (S50) may further include a step (S50-1) in which the controller confirms a driving mode of the vehicle, and in the case in which the driving mode is a normal mode or an eco mode as a result of performing the step (S50-1), the controller may limit the shift speed to the allowable shift speed at S50-3.

To the contrary, when the driving mode is a sport mode as a result of performing the step (S50-1), the controller may control an engine to be driven at a target RPM so that the allowable shift speed is increased to arrive at the shift speed (S50-2).

The target RPM, which is an engine RPM value at which the allowable shift speed is increased to arrive at the shift speed, may be calculated through a plurality of experiments.

If the driving mode of the vehicle is the sport mode and the shift speed is limited to the allowable shift speed, an output of the vehicle desired by a driver may not be implemented, such that satisfaction of the driver for the driving may be decreased. Therefore, the controller does not limit the shift speed of the vehicle when the driving mode is in the sport mode, instead controls the allowable shift speed to arrive at a current shift speed of the vehicle, thereby making it possible to follow an accurate line pressure, prevent or inhibit the phenomenon that the damper is released, and provide the satisfaction of the driver for the driving.

According to the method for controlling a shift speed of a continuous variable transmission having the structure as described above, it is possible to accurately follow a channel line pressure in the continuous variable transmission and inhibit generation of the phenomenon that the damper is released due to a decrease in a surplus oil amount.

Although the present disclosure has been shown and described with respect to specific exemplary forms, it will be obvious to those skilled in the art that the present disclosure may be variously modified and altered without departing from the spirit and scope of the present disclosure.

What is claimed is:

1. A method for controlling a shift speed of a continuous variable transmission, comprising:
    a first calculating step in which a controller calculates a surplus oil pump revolution per minute (RPM) based on a transmission oil temperature, an engine RPM, and a turbine torque;
    a second calculating step in which the controller calculates a surplus oil amount based on the surplus oil pump RPM, the transmission oil temperature, the engine RPM, and a line pressure after the first calculating step;
    a third calculating step in which the controller calculates an allowable shift speed based on the surplus oil amount and a current gear ratio after the second calculating step;
    a shift speed comparing step in which the controller compares a shift speed of a vehicle with the allowable shift speed after the third calculating step; and
    a shift speed controlling step in which the controller varies at least one of the shift speed or the allowable shift speed to control the shift speed to be maintained to be equal to or less than the allowable shift speed when the shift speed exceeds the allowable shift speed at the shift speed comparing step.

2. The method of claim 1, wherein the shift speed controlling step further includes a step in which the controller confirms a driving mode of the vehicle, and
    when the driving mode is a normal mode or an eco mode, the controller limits the shift speed to the allowable shift speed.

3. The method of claim 2, wherein when the driving mode is a sport mode, the controller controls an engine to be driven at a target RPM so that the allowable shift speed is increased to arrive at the shift speed.

4. The method of claim 1, wherein in the first calculating step, the controller calculates a minimum oil pump RPM based on the turbine torque, the engine RPM, and the transmission oil temperature, and compares the calculated minimum oil pump RPM and the engine RPM with each other to calculate the surplus oil pump RPM.

5. The method of claim 1, wherein in the second calculating step, the controller calculates a minimum oil amount based on the surplus oil pump RPM, the transmission oil temperature, the engine RPM, and the line pressure, and compares the calculated minimum oil amount and a current oil amount with each other to calculate the surplus oil amount.

6. The method of claim 1, wherein in the third calculating step, the allowable shift speed is a value pre-mapped to be in proportion to the surplus oil amount and in reverse proportion to the current gear ratio.

* * * * *